United States Patent
Garcia et al.

(10) Patent No.: US 10,328,575 B2
(45) Date of Patent: Jun. 25, 2019

(54) METHOD FOR BUILDING A MAP OF PROBABILITY OF ONE OF ABSENCE AND PRESENCE OF OBSTACLES FOR AN AUTONOMOUS ROBOT

(71) Applicant: SOFTBANK ROBOTICS EUROPE, Paris (FR)

(72) Inventors: Nicolas Garcia, Paris (FR); Lucas Souchet, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 90 days.

(21) Appl. No.: 15/314,475

(22) PCT Filed: Jun. 5, 2015

(86) PCT No.: PCT/EP2015/062611
§ 371 (c)(1),
(2) Date: Nov. 28, 2016

(87) PCT Pub. No.: WO2015/185741
PCT Pub. Date: Dec. 10, 2015

(65) Prior Publication Data
US 2017/0197311 A1    Jul. 13, 2017

(30) Foreign Application Priority Data
Jun. 5, 2014   (EP) .................... 14305849

(51) Int. Cl.
*B25J 9/16*  (2006.01)
*G01S 15/93*  (2006.01)
(Continued)

(52) U.S. Cl.
CPC .......... *B25J 9/1666* (2013.01); *B25J 9/1697* (2013.01); *G01S 15/89* (2013.01); *G01S 15/931* (2013.01);
(Continued)

(58) Field of Classification Search
CPC ....... B25J 9/1666; B25J 9/1697; G01S 15/89; G01S 15/931; G01S 17/89; G01S 17/936;
(Continued)

(56) References Cited

U.S. PATENT DOCUMENTS

2005/0131581 A1*   6/2005  Sabe ................. G06K 9/00201
                                                          700/245
2008/0027591 A1    1/2008  Lenser et al.
(Continued)

FOREIGN PATENT DOCUMENTS

EP    1 742 083 A1    1/2007
EP    2 933 604 A1   10/2015
(Continued)

OTHER PUBLICATIONS

E. Besada-Portas et al., "Unified fusion system based on Bayesian networks for autonomous mobile robots," Proceedings of the Fifth International Conference on Information Fusion, Jul. 8, 2012, pp. 873-880, XP032457139.
(Continued)

*Primary Examiner* — Ryan Rink
(74) *Attorney, Agent, or Firm* — Baker & Hostetler LLP

(57) ABSTRACT

A method to compute a pixel map of probabilities of absence and presence of an obstacle in the environment of an autonomous robot comprising at least one sensor grouped in at least one set of sensors that detect obstacles of similar types and have its own sensor initial map of probability of absence of obstacles is provided. The method comprises the steps of initializing a map around the robot and attached to the robot with a predefined value of probability of absence or presence of an obstacle, acquiring data representative of the absence or presence of an obstacle around the robot from at least one sensing procedure, and concurrently updating values of probabilities using data from sensing procedure
(Continued)

and modifying the probabilities of absence or presence of obstacle from previous observations to a value closer to a predefined value.

16 Claims, 8 Drawing Sheets

(51) Int. Cl.
  *G01S 15/89*  (2006.01)
  *G05D 1/02*  (2006.01)
  *G01S 17/89*  (2006.01)
  *G01S 17/93*  (2006.01)

(52) U.S. Cl.
  CPC ............ *G01S 17/89* (2013.01); *G01S 17/936* (2013.01); *G05D 1/024* (2013.01); *G05D 1/0227* (2013.01); *G05D 1/0246* (2013.01); *G05D 1/0255* (2013.01); *G05D 1/0274* (2013.01); *G05D 2201/0217* (2013.01)

(58) Field of Classification Search
  CPC .... G05D 1/0227; G05D 1/024; G05D 1/0246; G05D 1/0255; G05D 1/0274; G05D 2201/0217; G05D 1/0027; G05D 1/0038; G05D 1/0088; G05D 1/0251; G05D 1/0257; G05D 1/027; G05D 1/0272; G05D 1/0278; G05D 1/0297; G05D 2201/0209; G01C 15/002; G06F 3/0412; H04L 67/125
  See application file for complete search history.

(56) References Cited

U.S. PATENT DOCUMENTS

| | | | | |
|---|---|---|---|---|
| 2011/0153136 | A1* | 6/2011 | Anderson | G05D 1/0219 701/25 |
| 2013/0242284 | A1* | 9/2013 | Zeng | G01S 17/66 356/4.01 |
| 2014/0142891 | A1 | 5/2014 | Lucidarme et al. | |
| 2016/0116916 | A1* | 4/2016 | Pink | G05D 1/0274 701/23 |
| 2017/0083023 | A1* | 3/2017 | Park | G05D 1/0219 |
| 2017/0116487 | A1* | 4/2017 | Yamazaki | G06K 9/00805 |
| 2017/0329008 | A1* | 11/2017 | Walessa | G01S 15/931 |
| 2017/0344025 | A1* | 11/2017 | Nakano | G05D 1/0274 |

FOREIGN PATENT DOCUMENTS

| | | |
|---|---|---|
| JP | 2004-298975 A | 10/2004 |
| JP | 2005-310043 A | 11/2005 |
| JP | 2006-239844 A | 9/2006 |
| KR | 2004-0087171 A | 10/2004 |
| WO | 2004/015369 A2 | 2/2004 |
| WO | 2009/124955 A2 | 10/2009 |
| WO | 2014/055278 A1 | 4/2014 |

OTHER PUBLICATIONS

Naveen Suresh Kuppuswamy et al., "A Cognitive Control Architecture for an Artificial Creature using Episodic Memory," SICE-ICCAS 2006 International Joint Conference, Oct. 1, 2006, pp. 3104-3110, XP031049935.
Michael Montemerlo et al., FastSLAM: A factored solution to the simultaneous localization and mapping problem, AAAI/IAAI, 2002, pp. 593-598.
Kaustubh Pathak et al., "3D Forward Sensor Modeling and Application to Occupancy Grid based Sensor Fusion," Proceedings of the 2007 IEEE/RSJ International Conference on Intelligent Robots and Systems, 2007, pp. 2059-2064.
Chieh-Chih Wang et al., "Simultaneous Localization, Mapping and Moving Object Tracking," Robotics Institute, School of Computer Science, Jun. 2007.
Sabe, et al., "Obstacle Avoidance and Path Planning for Humanoid Robots Using Stereo Vision", IEEE International Conference on Robotics and Automation, 2004.
Elfes, "Occupancy Grids: A Stochastic Spatial Representation for Active Robot Perception", Proceedings of the Sixth Conference on Uncertainty in Artificial Intelligence, (UAI1990), pp. 136-146, Jul. 27-29, 1990.
Maier, et al., "Integrated Perception, Mapping, and Footstep Planning for Humanoid Navigation Among 3D Obstacles", 2013 IEEE/RSJ International Conference on Intelligent Robots and Systems.
Elfes, "Using occupancy grids for mobile robot perception and navigation", IEEE Computer, vol. 22, Issue: 6, pp. 46-57,Jun. 1989.
Miura, et al., "Mobile Robot Map Generation by Integrating Omnidirectional Stereo and Laser Range Finder", IEEE/RSJ International Conference on Intelligent Robots and Systems, Oct. 2002.

* cited by examiner

METHOD FOR BUILDING A MAP OF PROBABILITY OF ONE OF ABSENCE AND PRESENCE OF OBSTACLES FOR AN AUTONOMOUS ROBOT

CROSS-REFERENCE TO RELATED APPLICATIONS

This application is a National Stage of International patent application PCT/EP2015/062611, filed on Jun. 5, 2015, which claims priority to foreign European patent application No. EP 14305849.3, filed on Jun. 5, 2014, the disclosures of which are incorporated by reference in their entirety.

FIELD OF THE INVENTION

The present invention relates to the field of robot programming systems. More specifically, it applies to the creation of a local map of probability of one of absence and presence of obstacles. Such a map is particularly, but not exclusively, applicable to collision avoidance techniques.

BACKGROUND PRIOR ART

A robot can be qualified as autonomous when it is able to perform behaviors or tasks with a high degree of autonomy, even in an initially unknown environment. In order to move and perform behaviors safely, an autonomous robot needs to locate and collect information about potentially hazardous obstacles.

Therefore, the problem of autonomously collecting information about local obstacles is a crucial problem in the field of robotics.

According to prior art, best known techniques for obstacle detection belong to a category of method called the "Simultaneous Localization And Mapping" (SLAM). These methods provide simultaneous detection of obstacles and positioning of a robot relative to its environment. SLAM techniques are disclosed by THRUN, S. BURGARD, W. FOX D. Probabilistic Robotic. MIT Press, 2005; MONTEMERLO, M. THRUN S. KOLLER D. WEGBREIT B., FastSLAM: A factored solution to the simultaneous localization and mapping problem, AAAI/IAAI, 2002, pages 593 a 598.

A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and dynamically and walk on two limbs, possibly in three dimensions, or simply roll over a base. It may pick up signals from the environment ("hear", "see", "touch", "sense", etc.) and react according to more or less sophisticated behaviors, and interact with other robots or humans, either by speech or by gesture.

Such a robot may be specifically designed for human interactions. However these interactions, including face and emotions recognitions, as well as gestures and dialogues, are highly CPU intensive. These interactions are the core of humanoid robots. Therefore, one problem that robot designers have to solve is to design all other robot functions to operate with the lowest possible CPU usage. These other functions include notably localization, collision avoidance, and obstacle detection, which have to be performed continuously from the moment when the robot is powered on.

The size of the environment map used by the robot in SLAM techniques increases when the robot discovers a new part of its environment. Since SLAM techniques use all known parts of the environment to compute robot position, it is almost impossible to provide an upper bound to obstacle detection complexity, and therefore CPU usage using a SLAM technique in an environment with an unknown size. Moreover, SLAM implementations use CPU-intensive techniques, such as covariance matrixes for EKF-SLAM (or Extended Kalman Filter SLAM). SLAM techniques estimates robot position as well as the position of a set of landmarks. As the robot discovers its environment, it adds new landmarks to this set. In EKF SLAM, each new landmark is added to a state vector and covariance matrix. Therefore, a large environment with a number of potential landmarks may cause very high complexity. Therefore, the use of SLAM techniques may result in a critical CPU usage for the sole localization and obstacle detection, threatening CPU availability for human interactions. Meanwhile, SLAM techniques are designed to locate a robot in a static world using static landmarks. Hence, it is inefficient at detecting mobile obstacles. C.-C Wang disclosed a method for simultaneously using SLAM and Mobile Object Tracking (MOT) in "Simultaneous localization, mapping and moving object tracking". However, this technique basically consists in the simultaneous execution of SLAM and MOT to overcome one SLAM limitation, thus adding even additional complexity.

European patent application n°14305543.2 discloses a method for localizing a robot in a localization plane that leads to a precise localization of a robot with reduced CPU usage compared to a SLAM technique.

Such a method solves the robot localization issue. But there is still a need to detect obstacles with sufficient reliability to avoid collision, while being the least complex and CPU intensive.

SUMMARY OF THE INVENTION

To this effect, the invention discloses a method for determining, by a computer on board of an autonomous robot, a pixel map of the probability of at least one of absence and presence of an obstacle in the environment of the robot, said method being characterized in that it comprises the steps of initializing, in a memory on board the robot, an initial map defined around the robot and substantially attached to said robot, said map having predefined limits and being paved by pixels of a predefined dimension, where a value of a probability of at least one of absence and presence of an obstacle in each pixel is set to a predefined value; acquiring from at least a sensing procedure, data representative of at least one of absence and presence of an obstacle in the environment of the robot; concurrently applying to the initial map procedures for at least updating values of probabilities of at least one of absence and presence of an obstacle in at least one pixel of the initial map of said data; modifying the probabilities of absence or presence of obstacle of previous observations to a value closer to a predefined value.

Advantageously, the initial map remains static in a fixed reference frame as long as the robot remains within a predetermined number of pixels, and moves with the robot when the robot moves out of this predetermined number of pixels.

Advantageously, the limits of the initial map are predefined as a function of dimensions of an area where said robot may face immediate collision threats.

Advantageously, the predefined dimension of a pixel is selected as a function of a collision avoidance distance.

Advantageously, the initial map defines a square.

Advantageously, the predefined value in the procedure of modifying the probabilities of one of presence and absence of obstacle of previous observations and for initializing the map is the average of the value that represents a presence of obstacle which is certain and the value that represents an absence of obstacle which is certain.

Advantageously, maps of probability of absence are computed, wherein the probability of absence of an obstacle is a number between 0 and 1, wherein 0 represents a presence of obstacle which is certain, 1 an absence of obstacle which is certain, and 0.5 an unknown presence of obstacle.

Advantageously, a threshold $Ts_{obs}$ for delimiting obstacle and unknown pixels is defined as a number in the interval [0;0.5], and a threshold $Ts_{free}$ for delimiting obstacle free and unknown pixels is defined as a number in the interval [0.5;1].

Advantageously, a temporal evolution ratio $R_{temp}$ for modifying the probabilities of absence of obstacle is defined according to said obstacle threshold and a predefined time of convergence $T_{conv}$ by the formula: $R_{temp}=\exp(\ln(1-2.0*Ts_{obs})/(T_{conv}*\text{update frequency}))$.

Advantageously, the procedure of modifying the probabilities of absence of obstacle of previous observations uses a geometric distribution law for computing the value of each pixel according to its value in the previous map, and uses the formula: $VC_{320}=R_{temp}*(VC_{310}-0.5)+0.5$, wherein $VC320$ is the modified value of the pixel and $VC310$ its previous value.

Advantageously, a plurality of initial maps is initialized for a plurality of complementary sensing procedures and the plurality of maps are concurrently merged into a fused map.

Advantageously, merging the plurality of initial maps satisfies: each pixel whose probability of absence of obstacle is below the threshold $Ts_{obs}$ in at least one of initial maps is an obstacle in the fused map; each pixel which is not an obstacle in the fused map and whose probability of absence of obstacle is above a threshold of $Ts_{free}$ in at least one of initial maps is an obstacle free pixel in the fused map.

Advantageously, merging the plurality of initial maps comprises the step of generating a first pre-fused map and a second pre-fused map; setting the value of the probability of absence of obstacle in a pixel in the first pre-fused map as the minimum of the values of the probability of absence in the same pixel in the plurality of initial maps; setting the value of the probability of absence of obstacle in a pixel in the second pre-fused map as the maximum of the values of the probability of absence in the same pixel in the plurality of initial maps; setting the value of the probability of absence of obstacle in a pixel in the first pre-fused map whose value is below the threshold of obstacle $Ts_{obs}$ to 0; setting the value of the probability of absence of obstacle in a pixel in the first pre-fused map whose value is above the threshold of obstacle $Ts_{obs}$ to 1; setting the value of the probability of absence of an obstacle in a pixel in the fused map (360) to the minimum of the value of probability of absence in the same pixel in the first and second pre-fused maps.

Advantageously, each map among the plurality of initial maps is updated using data acquired from a different set of sensors, which groups sensors that observe the same type of obstacles.

Advantageously, a first set of sensor groups laser sensors on board the robot; a second set of sensors 3D cameras on board the robot; a third set of sensors groups ultrasonic sensors on board the robot; a fourth set of sensors groups contact sensors on board the robot.

Advantageously, the step of acquiring, from at least a sensing procedure, data representative of at least one of absence and presence of an obstacle in the environment of the robot comprises at least: acquiring raw data values from a sensor; creating a 6D sensor transform associated with the sensor using a robot kinematic joint model and angular articular sensors; using said 6D sensor transform and said raw data to create a set of 3D points representing the obstacles observed by the sensor.

Advantageously, updating values of probabilities of at least one of absence and presence of an obstacle in at least one pixel in the initial map comprises at least: filling at least one 2D pixel where at least one 3D point is found with a value representative of a presence of an obstacle which is certain; filling each line between said at least one pixel and the position of the sensor with a value representative of an absence of obstacle which is certain.

The invention also discloses a an autonomous robot comprising at least a plurality of distance sensors; a robot kinematic joint model; an on-board memory to store an initial map defined around the robot, having predefined limits and being paved by pixels of a predefined dimension, where a value of probability of at least one of presence and absence of an obstacle is stored; a module for initializing said map by setting the value of each pixel to a predefined value; a module for acquiring, from at least one of said directional distance sensors, data representative of at least one of absence and presence of an obstacle in the environment of the robot; a module for concurrently applying to said map the procedures for at least: updating values of probabilities of at least one of absence and presence of an obstacle in at least one pixel of the initial map from said data; modifying the probabilities of absence or presence of obstacle of previous observations to a value closer to a predefined value.

The invention also discloses a computer program product, stored on a computer readable medium, comprising code means for causing the computer to implement the method of determining a pixel map of the probability of at least one of absence and presence of an obstacle in the environment of the robot, said computer program product being characterized in that it comprises at least a module for initializing, in a memory, an initial map defined around an autonomous robot and attached to said robot, said map having predefined limits and being paved by pixels of a predefined dimension, where a value of a probability of at least one of absence an presence of an obstacle in each pixel is set to a predefined value; a module for acquiring, from at least a sensing procedure of a first type, data representative of at least one of absence and presence of an obstacle in the environment of the robot; a module for concurrently applying to the initial map procedures for at least: updating values of probabilities of at least one of absence and presence of an obstacle in at least one pixel of the initial map from said data; modifying the probabilities of on of absence and presence of an obstacle of previous observations to a value closer to a predefined value.

The invention discloses a method for building a map with all threats and obstacles in the close environment of an autonomous robot. This can essentially, but not only, be used for collision avoidance. It may also be used for trajectory computation.

A method according to the invention has a very low CPU usage. Indeed, it operates on pixel maps with a limited and bounded number of pixels, using simple operations like pixel values comparisons and filling.

It also has low memory footprint, due to the limited number and size of the maps. Moreover, the memory footprint of a method according to the invention is bounded.

The invention also detects mobile obstacle appearance and disappearance without any additional complexity.

In a number of embodiments, the invention also takes advantage of all kinds of sensors in a robot to use a finer detection of all types of obstacles.

Therefore, a method according to the invention detects obstacles with a sufficient reliability to ensure safety to both robot and environment (people, surrounding objects . . . ), while saving CPU and memory for human interaction of an humanoid robot.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

Figure 1:
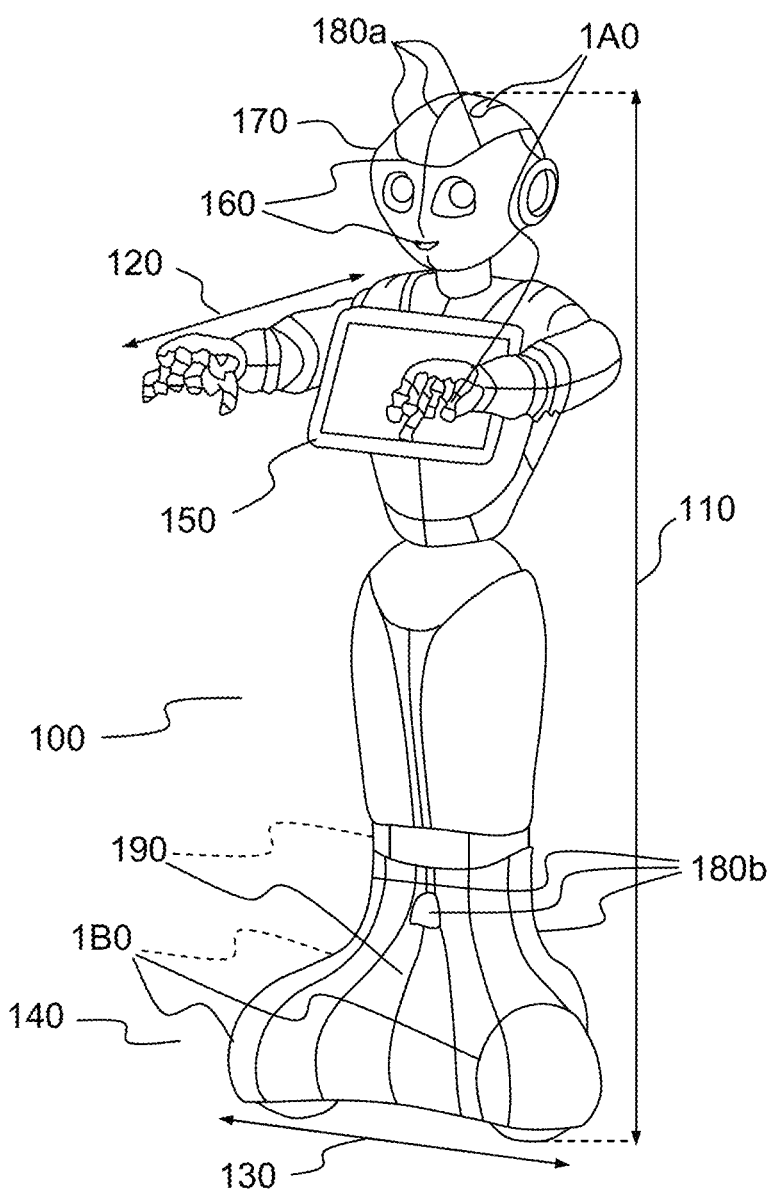
FIG. 1 displays a physical architecture of a humanoid robot in a number of embodiments of the invention.

FIG. 1 displays a physical architecture of a humanoid robot in a number of embodiments of the invention.

The specific robot 100 on the figure is taken as an example only of a humanoid robot in which the invention can be implemented. The lower limb of the robot on the figure is not functional for walking, but can move in any direction on its base 140 which rolls on the surface on which it lays. The invention can be easily implemented in a robot which is fit for walking as, for example, the Nao™ robot. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-Minebea™ (SE24P2CTCA for instance) can be used, or brushless DC motors from Maxon™ (EC45_70 W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras 160 on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor 170 can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head 180a and three in the base 180b, so as to be able to sense its relative position to objects/beings in its environment. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors 190, possibly located at the front and the back of its base, to measure the distance to objects/human beings in its environment.

The robot can also include tactile sensors, on its head and on its hands, to allow interaction with human beings. It can also include bumpers 1B0 on its base to sense obstacles it encounters on its route.

The robot can also sense contact of its upper members with objects that they touch by calculating a difference between a planned trajectory and an actual trajectory.

To translate its emotions and communicate with human beings in its environment, the robot of the invention can also include:

LEDs, for instance in its eyes, ears and on its shoulders;
Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with an energy of about 400 Wh. The robot can access a charging station fit for the type of battery that it includes.

Figure 2:
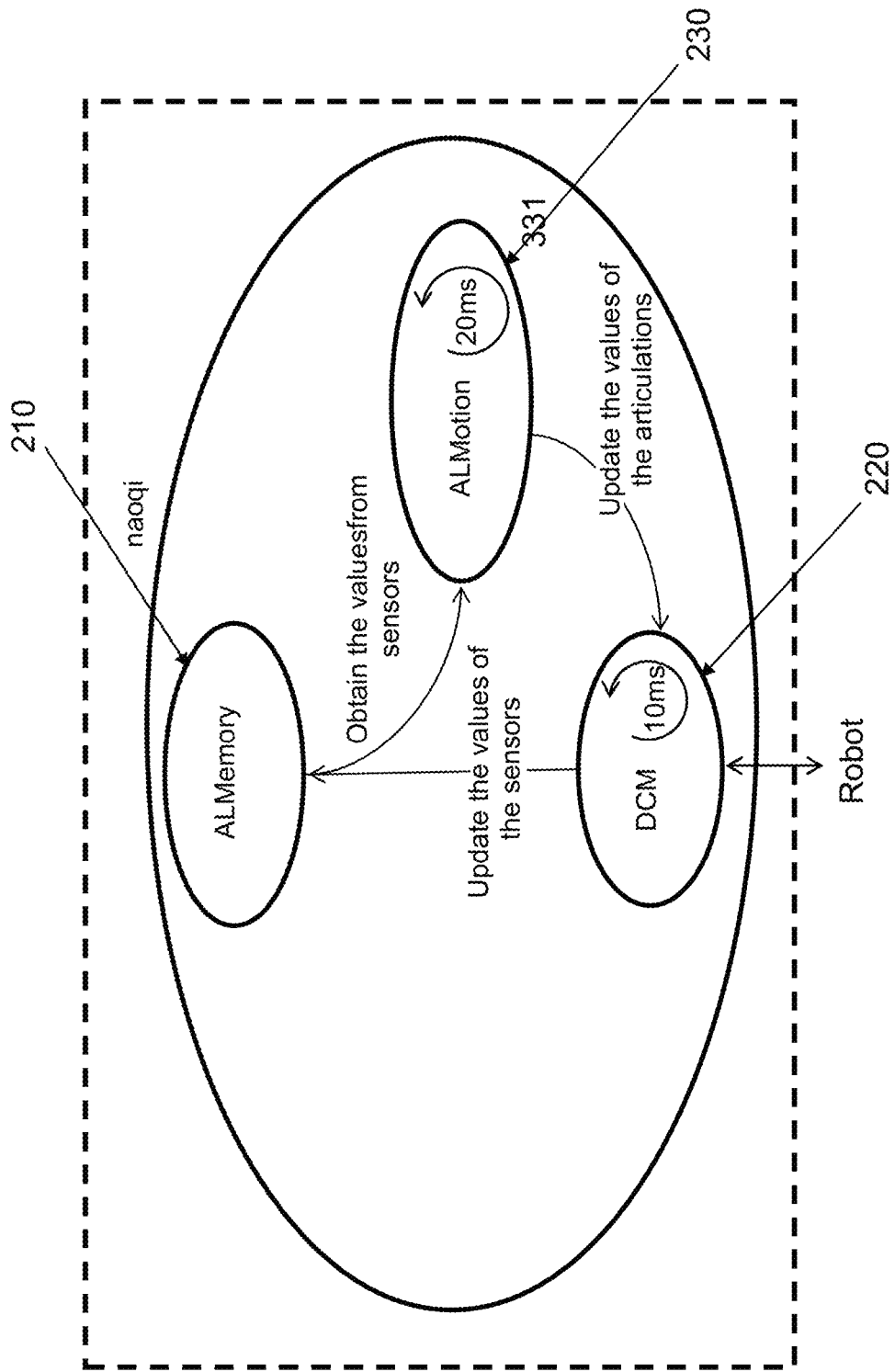
FIG. 2 displays a functional architecture of the software modules of the robot in a number of embodiments of the invention.

FIG. 2 is a diagram of a physical and functional architecture allowing the implementation of the invention in several of its embodiments.

A robot such as NAO is advantageously endowed with high-level software allowing the piloting of the functions of the robot in an embodiment of the invention. A software architecture of this type, dubbed NAOQI, has been disclosed notably in patent application WO2009/124955 published on Oct. 15, 2009. It comprises the basic functions for managing the communications between a robot and a PC or a remote site and exchanging software which provides the software infrastructure necessary for the implementation of the present invention.

NAOQI is a framework optimized for robotic applications; it supports several languages, notably C++, Python and Urbi.

Within the context of the present invention, the following modules of NAOQI are particularly useful:
- the module ALMemory, 210, manages a memory shared between the various modules of NAOQI;
- the module DCM, 220, manages the communications with the physical robot (motors, sensors);
- the module ALMotion, 230, computes the movements of various parts of the robot and therefore the positions/orientations of the sensors in a frame of reference;

These three modules are advantageously coded in C++. The figure also indicates the data flows between modules.

In particular, the inputs necessary for the implementation of the map of probability of one of absence and presence of obstacle functions are:
- the values of the sensors (feet pressure force sensors, laser, ultrasonic sensor for example);
- the robot's posture;

At regular time intervals, obstacle absence map building function updates its maps of probability of one of absence and presence of obstacles. To do so, it picks up sensor values from DCM module 220, and robot posture values from ALRobotPosture module 230.

Figure 3:
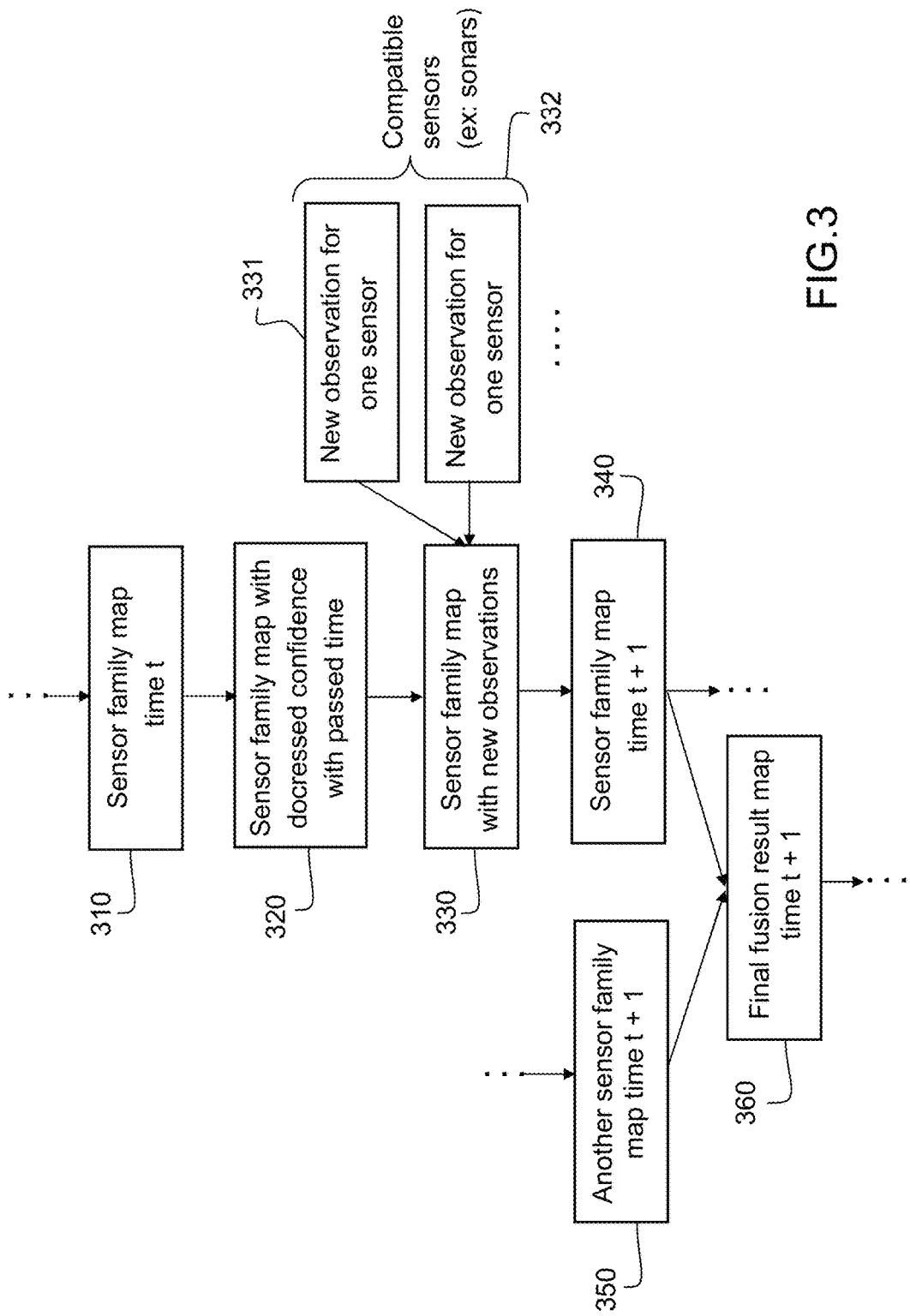
FIG. 3 displays a global flow chart for a number of embodiment of the invention.

FIG. 3 displays a global flow chart for a number of embodiments of the invention.

In a number of embodiments of the invention, sensors are grouped into sensor families. Each sensor family may comprise one or more sensors. Advantageously, sensors in each family comprise sensors that are designed to observe the same type of obstacles. For example, the robot 100 may comprise a 3D camera sensor 170, a second family with three laser line generators 180a and three laser lines generators 180b, a third family with two sonar sensors 190, and a fourth family with tactile sensors, bumpers 1B0 and any sensor that senses contact, including a logical sensor that sense contact through the computation of a difference between planned and actual trajectory.

In the examples below, maps of probability of absence of obstacles are computed, with a range of [0;1], wherein a probability of 1 indicates an absence of obstacle which is certain, a probability of 0 a presence of obstacle which is certain, and 0.5 an unknown probability of absence of obstacle. The invention is not limited to such examples and representation of probabilities, and it is a straightforward task for the skilled man to embed the invention with another representation of obstacles. For example, maps of probability of presence of obstacles may be computed instead, wherein 1 represent a presence of obstacle which is certain, and 0 an absence of obstacle which is certain. The [0;1] interval of probability may be replaced by a percentage, a state of occupation with a discrete values, a boolean value representing a presence or absence of obstacle, or any other scale that represents the presence or absence of obstacle.

From each sensor family a sensor family map is created (310, 320, 330, 340). In the rest of the description, a sensor family map may be referred to as "sensor family map" or "initial map". A fused map is formed 360 by merging information from each sensor family map 340, 350. Each one of these maps is attached to the robot, and has predefined size and pixel dimension. In a number of embodiments of the invention, all maps have the same size, pixel dimension and origin. Hence, pixels with given coordinates represents the same area in each map, which makes the comparisons and operations between map pixels very easy. In the remaining, references to FIG. 3 will both indicate the procedure and the map that is created or modified at the end of the procedure. For example, 330 may designate the procedure of updating a sensor family map as well as the map that has been updated. The predefined pixel dimension may be set at a value which is a function of the minimum stop distance of the robot, when moving at its slowest speed, for instance 10 cm, so that, when an obstacle is detected within the closest pixel, the robot is in a position to stop. The map dimension may then be determined as a function of a limit set to the processing capability used by the method of the invention, for instance 30×30 (900) pixels of the predetermined 10 cm size, which gives a predefined dimension of the map of 3 m, and a distance of 1.5 m between the robot and the limits of the map. The predefined dimension of the map may also be determined first as a function of the possible obstacles in the environment of the robot, and then either the number of pixels or their size, or a combination of both, can be determined as a function of the processing capability to be assigned to the method of the invention. These trade-offs can be determined by a man of ordinary skill and then programmed in a software module of the robot, using procedures known to the man of ordinary skill.

Sensor family maps 340 and 350, and fusion map 360 are updated on a regular basis. In the robot 100, 3D Camera 170, laser lines generator 180a and 180b, and sonar sensors 190 all generate measures at their own frequency. Advantageously, sensor family maps and fused map are updated at the lowest frequency of from all sensors. In an embodiment, sensors and maps are updated at 10 fps. This frequency will be referred to as "update frequency". This example is non limitative, and any update frequency could be chosen, an old measure could be used from any sensor if no new measure is available for an update frequency.

At each update, a sensor family map 340 is produced for each sensor family using a previous map for this family of sensors 310, as well as new observations 331, 332 from sensors that belong to this family. At step 320, a procedure is applied for updating pixel values of previous map 310. In the example, such procedure brings values in every pixel closer to the value 0.5, thus giving less worth to previous observations. At the end of this procedure, previous map 310 is transformed into a sensor family map with decreased confidence 320. This map with decreased confidence 320 is afterwards, at step 330, updated with new observations from sensors 331 and 332. This update procedure fills each pixel where sensor has observed an absence of obstacle with probability of absence of obstacle of 1, and each pixel where sensor has observed a presence of obstacle by a probability of absence of obstacle of 0. Once map 320 has been updated with observations from each sensor that belongs to its sensor family, it is transformed into sensor family map 340 that contains all information available at the time from one family of sensors.

In a number of embodiments, sensors in the robot have different degrees of reliability. For example, an older sensor may be considered as less reliable than a newer one. Information about the reliability of observations is therefore added during update 330 to the update pixels. This may be done by setting a value closer to 0.5 for a less reliable sensor, or adding reliability information in addition to the probability of absence of obstacle. Reliability may also be set as a function of the type of sensor, depending for instance on the environment of the robot. By way of example, it is known to a man of ordinary skill that laser line generators are more error prone in an environment where there are a number of see-through obstacles. Conversely, in this type of environment, sonar sensors will be more reliable.

For the first execution of the global procedure, the map 310 is initialized in the memory with a pre-defined value. In a preferred embodiment, said predefined value indicates an unknown presence of obstacle. In the example, map 310 is initialized with value 0.5 in all its pixels, at the first execution of the process. For all other executions, map 310 is the sensor family map 340 that has been generated during the previous update. In case where the position of the robot changed, pixels of the map may be translated. This may happen when the robot is not anymore at the center of the map. For example, pixels of the map may be translated if at the start of the procedure the robot is few pixels distant from the center of the map, or if its distance from the center of the map is close to the dimension of the robot. It is also possible to translate the pixels if the robot is distant to the center of the map by above a predefined value, for example 30 cm. In case of translation, the origin of the map is shifted by an integer number of pixels in horizontal and/or vertical direction or in the direction of motion of the robot. Thus, the values of all pixels are shifted in that direction. For example, if the robot is 30 cm above the center of the map, and pixel size is 10 cm, the position of the map can be shifted 30 cm in the top of vertical axis in the fixed referential, and the value of all each pixel can be set to the value of the previous pixel that was located 3 pixels below. All pixels located on the border on the map where no previous value is found in the previous map are set to the unknown value 0.5.

At each update, sensor family maps 340 and 350 are fused to create a fused map 360. In a number of embodiments of the invention, this fusion procedure is designed to keep the obstacles detected by at least one of sensor families. This fused map 360 contains all information from previous observations, and new observations for each sensor for each sensor families. It is therefore suitable for use in applications that needs the most complete description of the absence of obstacles, such as trajectory computation.

Figure 4:
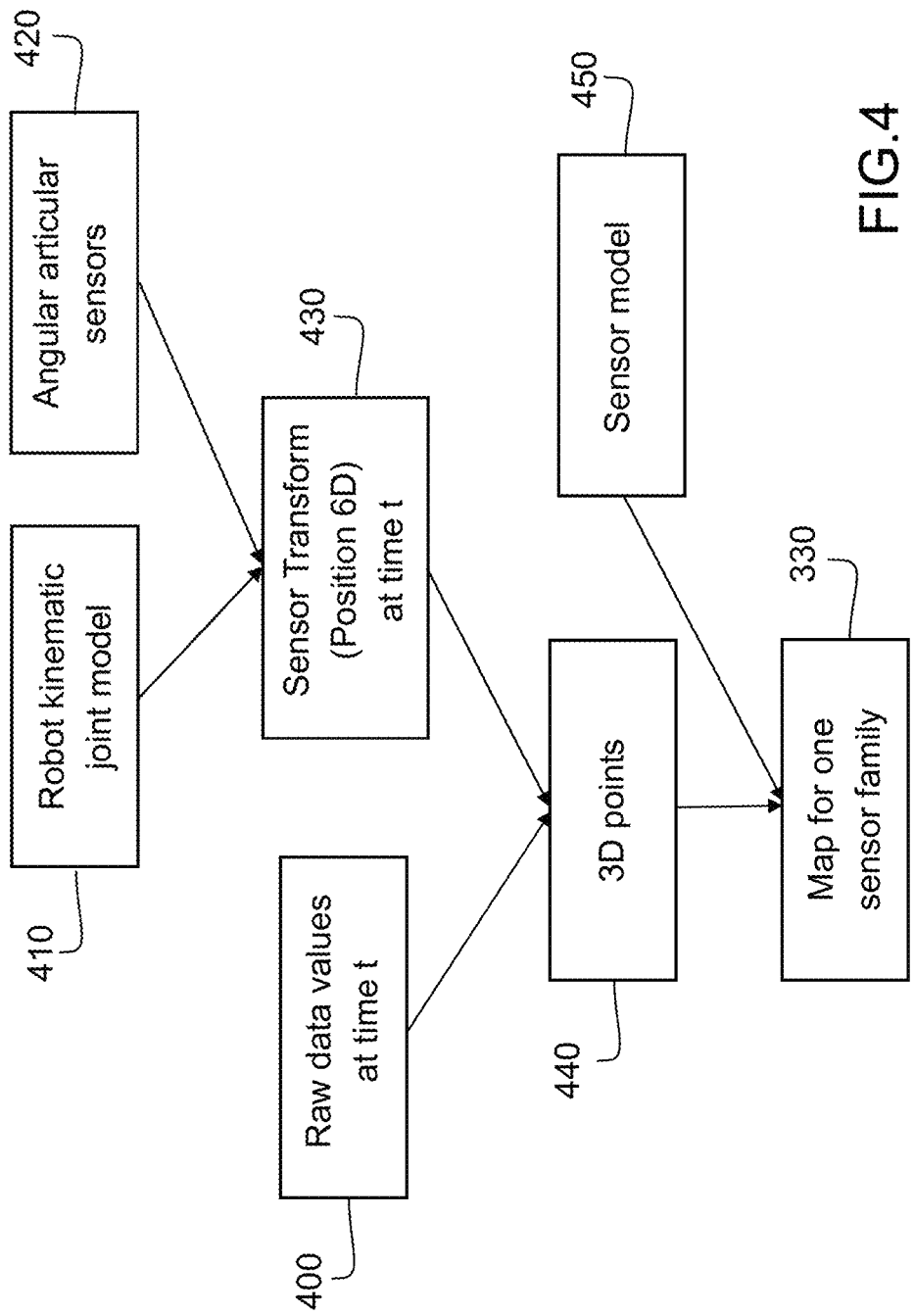
FIG. 4 displays a flow chart for the update of a sensor family map with an observation from one sensor in a number of embodiments of the invention.

FIG. 4 displays a flow chart for the update of a sensor family map with an observation from one sensor in a number of embodiments of the invention.

Every sensor provides raw data 400 that represents its type of observation. For example, laser sensors 180a and 180b provide the distance of the closest non-transparent surface in the direction they are facing, while bumpers 1B0 indicate the occurrence of a contact in their location.

3D position and orientation of a sensor are deduced using a Robot kinematic joint model 410 and angular sensors 420 of the joint, that contains information about the 6D location and orientation of the sensor in the robot coordinate system, and the 6D location and orientation of the robot in a fixed coordinate system. This information allows the creation of a 6D sensor transform 430 that translates the 3D points detected by the sensor into a set of 3D points 440 expressed in the fixed coordinate system. For example an obstacle that has been observed at a distance of 3 meters from a laser sensor 180a may easily be localized in a fixed 3D coordinate system with the knowledge of robot kinematic joint model 410 and angular joint sensors 420 that indicates the relative position of the sensor in the robot coordinate system. In another example, if one of bumper 1B0 has detected the occurrence of a contact, a 3D point that represents an obstacle can be placed in the exact 3D location of the bumper using robot model 410 and joint sensors 420.

Finally, a sensor model 450 is used to update the sensor family map during step 330 using 3D points 440. For example, the model for laser sensors 180a may translate the fact that an obstacle has been observed at the distance returned by the laser sensor in its orientation, and no obstacle has been observed between the laser sensor and this obstacle. Therefore, a 3D point obstacle returned by a laser sensor may update sensor family map 330 by first setting in the map 330 a probability of absence of obstacle of 0 in the pixel located at this 3D point in the fixed coordinate system, and set a probability of absence of obstacle of 1 at all pixels located in a line between the 3D point and the laser sensor in the fixed coordinate system. In an example using bumper sensor 180a, if a 3D point exists, an obstacle can be placed by setting the probability of absence of obstacle to 0 in the pixel of map 330 where the 3D point is located. If no 3D point exists for this sensor, no contact occurred in its position. It is therefore possible to update the map by setting the probability of absence of obstacle to 1 in the pixel where the bumper sensor is located in the map 330.

Figure 5:
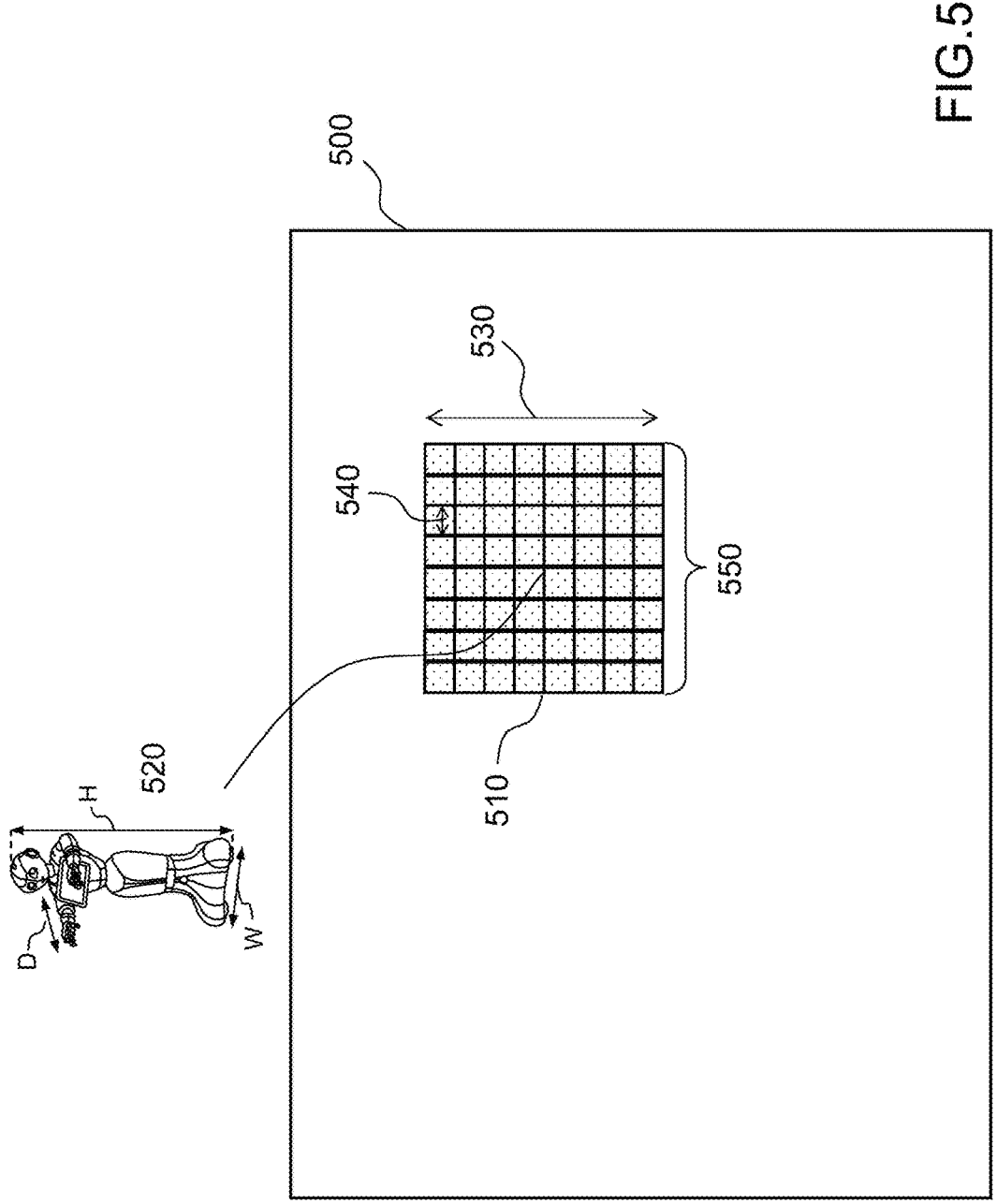
FIG. 5 provides an example of pixel area where maps are computed in a number of embodiments of the invention.

FIG. 5 provides an example of pixel area where maps are computed in a number of embodiments of the invention.

The square 500 represents the limits of the environment where the robot evolves. This environment may be a single room. The robot 100 is located in the position 520. In a number of embodiments, this area is designed to cover all areas where the robot may face an immediate threat of collision with an obstacle.

Advantageously, maps are computed in a square area 510 substantially centered on the position of the robot 520. Although the map remains substantially attached to the robot during all the process, the position of the robot 520 can be slightly different from the center of the map. Indeed, having a position of the robot precisely on the center of the map would involve translating pixels of the previous map 310 at nearly every cycle, with non-integer pixels shifts, which would not be desirable. Therefore, the robot is located near the center of map 510, and the map is translated in order that the center of the map is close to the position of the robot 520 at the beginning of each cycle where the robot position 520 is further than a predefined distance from the center of the map.

Width 530 and pixel dimension 540 of map 510 are a compromise between map size and computational complexity. In a number of embodiments, pixel dimension is a function of a collision avoidance distance. It can be a function of the minimum distance to sense obstacles and stop the robot. In a number of embodiments, this minimum distance is few times smaller than the smallest robot dimension. For example, a pixel dimension 540 of 10 cm can be defined for the robot 100. Using such pixel dimension, the robot occupies the surface of few pixels. Therefore, the pixel dimension 540 is sufficient for a fine detection of obstacles for this kind of robot, while limiting the number of pixels. Width 530 of the map should be designed to cover areas where the robot may face an immediate collision threat, while not being too large to lower computational load. This may be designed to cover all area where the robot may be located in few seconds at maximal speed. This width 530, as well as pixel dimension 540 may also be predefined for a robot model, or by a robot reseller to be tailored for robot-specific application. In the example, the pixel dimension is defined to 10 cm and the size of the map to 1.5 m×1.5 m, which represents a 30×30 pixel area. Hence, with the proper definition of pixel dimension 540 and width 530 the computation of probability of absence of obstacle in this area is sufficient to avoid obstacles, while limiting the size of maps, and therefore CPU and memory usage. Unlike SLAM techniques, the computation of obstacles in the invention only occurs for a limited area and a limited number of values, which reduces CPU and memory footprint of obstacle presence computation. Moreover, it provides a bounded area, unlike SLAM techniques.

Figure 6:
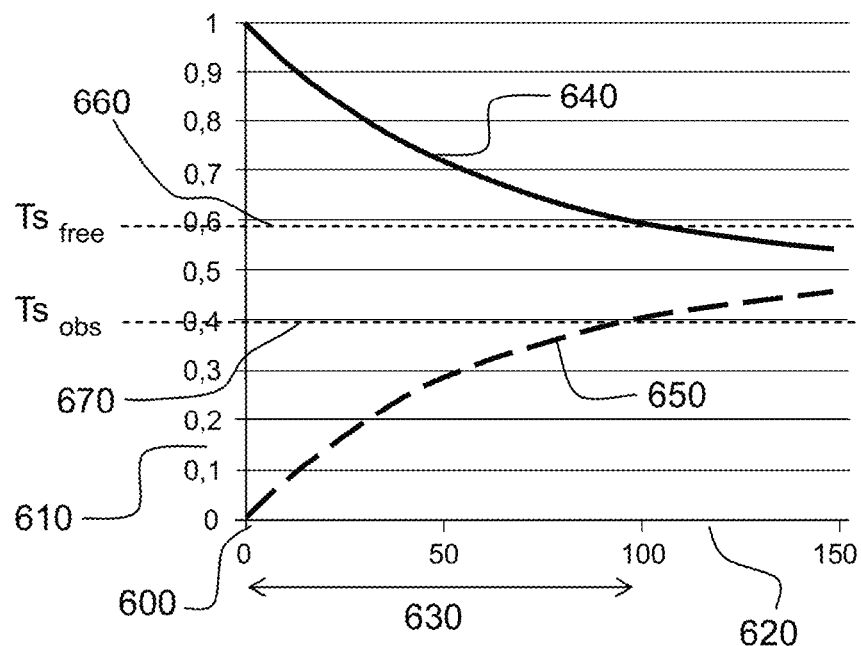
FIG. 6 provides an example of the temporal evolution of probability of absence of obstacle in a number of embodiments of the invention.

FIG. 6 provides an example of the temporal evolution of probability of absence of obstacle in a number of embodiments of the invention.

The sensor family map with decreased confidence 320 is created using the previous sensor family map 310. To this effect, all pixels in map 310 where an obstacle has previously been detected (probability of absence of obstacle<0.5) have their probability of absence of obstacle increased, while pixels where an absence of obstacle has been detected (probability of absence of obstacle>0.5) have their probability of absence of obstacle lowered. The graph 600 displays an example of evolution of probability of absence of obstacle over successive updates for a pixel whose value is not updated by new observations. Vertical axis 610 displays the probability of absence of an obstacle, between 0 and 1. Horizontal axis 620 displays the number of successive updates. Double arrow 630 represents the maximum number of updates necessary for any obstacle pixel to have probability of absence of obstacle above $Ts_{obs}$, and therefore be considered as an unknown call. Line 640 represents an example of the evolution of the probability of absence of obstacle for a pixel whose original probability is 1. Line 650 represents an example an example of the evolution of the probability of absence of obstacle for a pixel whose original probability is 0. Line 660 represents the line above which the value in a pixel is considered as obstacle free, if the value of obstacle free threshold $Ts_{free}$ is slightly above 0.5, for instance 0.6. Line 670 represents the line below which the value in a pixel is considered as an obstacle, if the value of obstacle threshold $Ts_{obs}$ is slightly under 0.5, for instance 0.4.

Probabilities of absence of obstacle follow a geometric distribution law to converge from 0 or 1 to the value 0.5. A predefined time of convergence $T_{conv}$ represents the time for any obstacle pixel to be considered as an unknown one. This time must be a compromise between the ability to not consider a pixel as an obstacle if no new observation has observed an obstacle in it, and the security of the robot. Its value can be set according to parameters such as the speed of the robot or the update frequency of the sensors. It may be fixed for a robot model, or set by robot retailer to be optimized for a specific purpose. In the example, $T_{conv}$ is set to 5 s. The maximum number of update 630 thus equals $T_{conv}$, expressed in seconds multiplying the update frequency, expressed in number of updates per second. In the example with $T_{conv}$=5 s and an update frequency of 20 updates per second, the maximum number of updates 630 is 100.

In the geometric distribution law, the value of each pixel in the map 320 depends of the value of this pixel in the map 310. If the value of a pixel in map 320 is defined as $VC_{320}$ and the value of the same pixel in map 310 $VC_{310}$, the procedure of modifying the values in step 320 uses the following formula: $VC_{320} = R_{temp} * (VC_{310} - 0.5) + 0.5$, wherein $R_{temp}$ ratio characterizes the temporal evolution of geometric distribution. Therefore, this $R_{temp}$ ratio is defined according to $T_{conv}$ so that an obstacle pixel with an initial probability of absence of obstacle of 0 needs a maximum number of updates 630 to obtain a probability of obstacle above the obstacle threshold $Ts_{obs}$. According to the geometric distribution law, $R_{temp}$ is given by the following formula:

$$R_{temp} = \exp\left(\frac{\ln(1 - 2.0 * Tsobs)}{Tconv * \text{update frequency}}\right).$$

In other embodiments of the invention, the evolution of probabilities of absence of obstacle over time is linear. This natural evolution of probability of absence of obstacle can also be embedded by lowering reliability information that has been added in addition to the probability of absence of obstacle in a number of embodiments.

Figure 7:
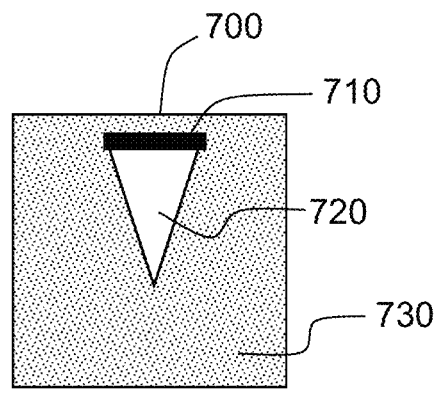
FIG. 7 displays an example of sensor family map, initialized with unknown probability and updated with a single sensor observation in a number of embodiments of the invention.

FIG. 7 displays an example of sensor family map, initialized with unknown probability and updated with a single sensor observation in a number of embodiments of the invention.

In a number of embodiments of the invention, for the first update, previous sensor family map 310 is initialized with unknown probabilities and all its pixels are set to 0.5. Step 320 has therefore no effect and at its end the sensor family map still has a value of 0.5 in all its pixels. The map 400 represents one of the maps 330 after update with data from one sensor 311. In this example, a distance sensor like one of ultrasonic sensors 190 is used. This sensor observes distant obstacles in an area that is representative of its field of view. In the example the field of view is a cone and, in every direction it considers the closest point observed as an obstacle, and all points in a line between the sensor and the obstacle as obstacle free points. Advantageously, the update with data from one sensor 331 replaces pixels where an obstacle has been observed by a probability of absence of obstacle of 0, creating obstacle pixels 710 displayed in black. It also replaces pixels where an absence of obstacle has been observed by a probability of absence of obstacle of 1, creating obstacle free pixels 720 displayed in white. All pixels where no presence or absence of obstacle has been observed keep their previous probability of absence value, 0.5 in this example. In this example, these pixels are obstacle unknown pixels 730 displayed in gray.

Figure 8A:
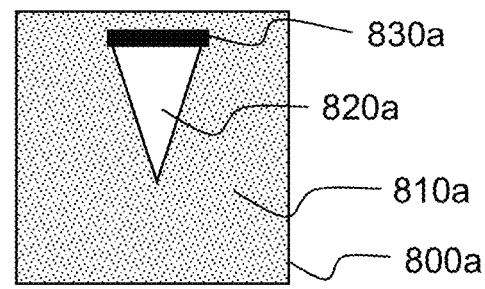
FIGS. 8a, 8b, 8c, 8d display the evolution of a sensor family map, with the concurrent update of older observations, and modifications of pixels according to new observations in a number of embodiments of the invention.
Figure 8B:
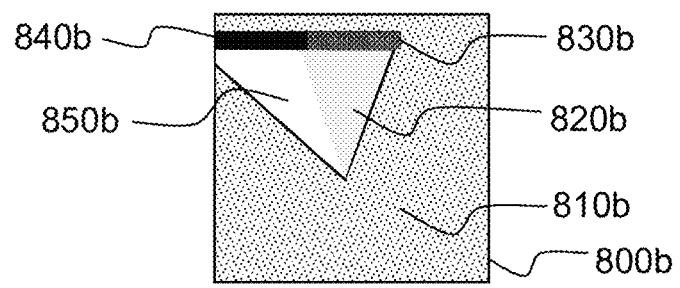
Figure 8C:
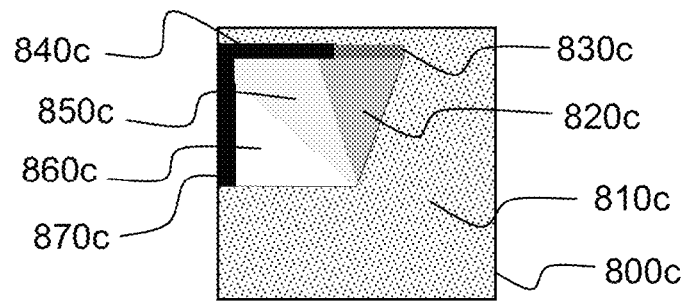

FIG. 8a, 8b, 8c display an example of a sensor family map 340 after 3 successive sensor family map update procedures, wherein the sensor family map comprises a single sensor whose position is fixed and whose field of view rotates.

Figure 8D:
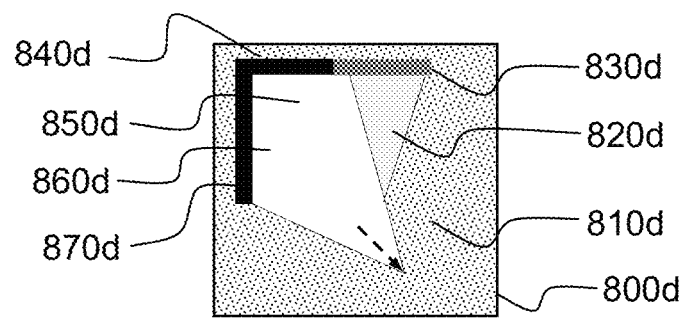

FIG. 8d displays an example of a sensor family map 340 after 3 successive updates, wherein the sensor family map comprises the same single sensor than in 8a, 8b, 8c, with an additional translation of the sensor between the first and the second sensor family map update procedure.

Sensor family map 800a represents the state of a sensor family map 340 after a first sensor family map update procedure 320, 330. For the first sensor family map update procedure, previous sensor family map 310 is initialized with a probability of absence of obstacle of 0.5. After probability update procedure 320 the sensor family map still has a probability of absence of obstacle of 0.5 in all its pixels. At step 330, a single sensor observation is applied, and pixels where an absence or presence of obstacle has been detected are filled. Sensor has detected obstacle pixels 830a and fills them with a probability of absence of obstacle of 0, and obstacle free pixels 820a, and fills them with a probability of absence of obstacle of 1. All pixels 810a where the sensor hasn't observed anything keep a probability of absence of obstacle of 0.5.

Sensor family map 800b represents the state of a sensor family map 340 after a second sensor family map update procedure 320, 330. Therefore sensor family map 800a is used as previous sensor family map 310 for the sensor family map update procedure. Sensor family map procedure brings all pixel values closer to unknown probability of absence 0.5. Therefore, the obstacle pixels observed in previous observation 830b have a probability of absence of obstacle slightly higher than 0, and obstacle free pixels observed during the first observation 820b have a probability of absence of obstacle slightly lower than 1. In addition, the second observation from the sensor has observed new obstacle and obstacle free zones. Therefore, obstacle pixels 840b are filled with a probability absence of obstacle of 0, and obstacle free pixels 850b are filled with a probability of absence of obstacle of 1.

Sensor family map 800c represents the state of a sensor family map 340 after a third sensor family map update procedure 320, 330. Therefore sensor family map 800b is used as previous sensor family map 310 for the sensor family map update procedure. Sensor family map procedure brings all pixel values closer to unknown probability of absence 0.5. Therefore, the obstacle pixels observed during the first observation 830c have a higher probability of absence of obstacle than the pixels 830b, and obstacle free pixels observed during the first observation 820c have a higher probability of absence of obstacle than the pixels 830c. Meanwhile, obstacle pixels observed during the second observation 840c have a probability of absence of obstacle slightly higher than 0 and obstacle free pixels observed during the second observation 850c have a probability of absence of obstacle slightly lower than 1. In addition, the third observation from the sensor has observed new obstacle and obstacle free zones. Therefore, obstacle pixels 870c are filled with a probability absence of obstacle of 0, and obstacle free pixels 860c are filled with a probability of absence of obstacle of 1

Sensor family map 800d represents the state of sensor family map 340 after 3 sensor family map update procedures, wherein the sensor also performed a translation between its first and second observation. In this map obstacle free pixels 820d, 850d and 860d have the same probability of absence of obstacle than obstacle free pixels 820c, 850c and 860c in map 800c. Meanwhile, obstacle pixels 830d, 840d, and 870d have the same probability of absence of obstacle than obstacle pixels 830c, 840c, and 870c. However, due the translation of the sensor, its fields of view during the second and third observation changed. Therefore, obstacle free pixels 850d and 860d are all obstacle free pixels that were included in these new fields of view.

Figure 9A:
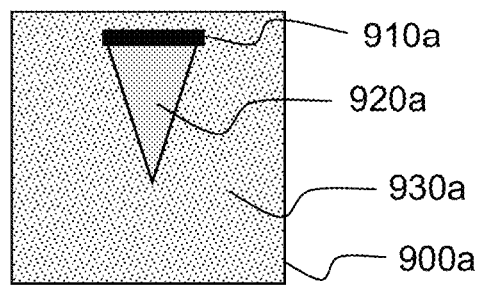
FIGS. 9a, 9b, 9c, provide an example of fusion of a plurality of sensor family maps, in a number of embodiments of the invention
Figure 9B:
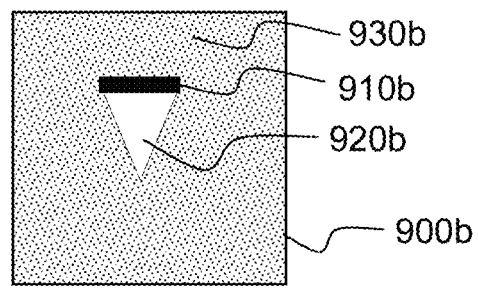
Figure 9C:
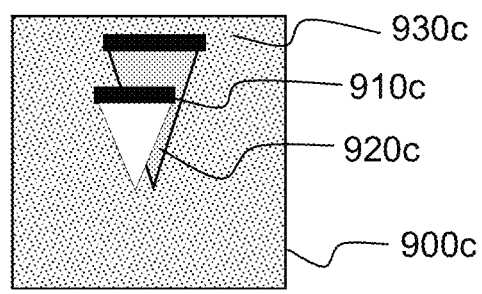

FIGS. 9a, 9b, 9c provide an example of fusion of sensor family maps, in a number of embodiments of the invention. FIG. 9a display a first sensor family map 900a, which comprises obstacle pixels 910a, obstacle free pixels 920a, and pixels with unknown probability 930a. Obstacle and obstacle free pixels 910a and 920a have been observed during a previous update. Therefore, probability of absence of obstacle of pixels 910a is slightly higher than 0, and probability of absence of obstacle of pixels 920a is slightly lower than 1. FIG. 9b displays a second sensor family map 900b.

Obstacle pixels 920b and obstacle free pixels 930b have been observed during the latest update. Therefore, obstacle pixels 920b have a probability of absence of obstacle of 0 and obstacle free pixels 930b have a probability of absence of obstacle of 1. FIG. 9c displays the final fusion result map 900c after the fusion of maps 900a and 900b at step 360. Advantageously, each pixel whose probability of absence of obstacle in at least one sensor family map is below the threshold $Ts_{obs}$ is considered as an obstacle.

Values in obstacle pixels 910a and 910b are all below the $Ts_{obs}$ threshold. Therefore, obstacle pixels 910c in final fusion map 900c comprise all pixels 910a and 910b, whose values of probability of absence of obstacle have been set to 0. The probability of absence of obstacle in obstacle free pixels 920a and 920b all are above $Ts_{free}$ threshold. Therefore, obstacle free pixels 920c in fused map 900c comprise all obstacle free pixels 920a and 920b, except pixels 910c which are obstacle pixels. Unknown pixels 930c in final fusion map 900c comprise all pixels which neither are obstacle or obstacle free pixels in any of sensor family maps.

In a number of embodiments, fused map 900c is computed pixel by pixel from maps 900a and 900b. The first step is to create a first and a second temporary or pre-fused maps. Each pixel in the first pre-fused map is set to the minimum value of the same pixel in all sensor family maps to merge, and each pixel in the second pre-fused map is set the maximum value of this pixel in all sensor family maps to merge. A procedure is then applied to the first pre-fused map to separate obstacles from all pixels: the value of each pixel in the first pre-fused map whose value is below $Ts_{obs}$ is set to 0, and the value of all other pixels in the first pre-fused map is set to 1. Then, the value of each pixel in the fused map is the minimum between first and second pre-fused map.

A generic algorithm for the fusion is:
Get two maps of the min of and the max of each source.
Threshold the min map to get only black and white.
Use a min between max and thresholded min map.
An exemplary pseudo-code for the embodiment of this algorithm is:

```
Create two temporary maps TMPmax and TMPmin.
##Min max step
For each pixel (i, j) of TMPmin, TMPmin(i,j) = min(900a(i,j), 900b(i,j))
For each pixel (i, j) of TMPmax, TMPmax(i,j) = max(900a(i,j), 900b(i,j))
Threshold binary step
Then for each pixel(i,j) in TMPmin,
    if TMPmin(i,j) < TSobs, TMPmin(i,j) = 0
    else TMPmin(i,j) = 1
We have only black and white in TMPmin
min step
We create 900c, following:
For each pixel (i,j) in 900c,
900c(i,j) = min(TMPmin(i,j), TMPmax(i,j))
```

Such pixel-per-pixel computation produces desirable results. Indeed, every pixel whose value is below $Ts_{obs}$ in at least one of sensor family maps 900a, 900b to merge has a probability of absence of obstacle of 0 in the first pre-fused map, and therefore in the fused map 900c. All other pixels that are not an obstacle one have a probability of 1 in the first pre-fused map. They will therefore get their value from the second pre-fused map during the merge procedure, and have the probability of an obstacle free cell if the value of this cell in at least one of the sensor family maps 900a, 900b to merge is above $Ts_{free}$.

The examples described above are given as illustrations of embodiments of the invention. They do not in any way limit the scope of the invention which is defined by the following claims.

The invention claimed is:

1. A method for determining, by a computer on board of an autonomous robot, a pixel map of the probability of at least one of absence and presence of an obstacle in the environment of the robot, said method comprising:

initializing, in a memory on-board the robot, a plurality of initial maps defined around the robot, said plurality of initial maps having predefined limits and being paved by pixels of a predefined dimension, where a value of a probability of at least of one of absence or presence of an obstacle in each pixel is set to a predefined value;

acquiring, from a plurality of complementary sensing procedures, data representative of at least one of absence and presence of an obstacle in the environment of the robot;

concurrently applying, for each one of the plurality of complementary sensing procedures, to an initial map in the plurality of initial maps the followings steps:
modifying values of probabilities of absence or presence of obstacle to a value closer to a predefined value; and
updating values of probabilities of at least one of absence and presence of an obstacle in at least one pixel of the initial map from said data; and after updating, merging the plurality of initial maps by a threshold $Ts_{obs}$ for delimiting obstacle and unknown pixels and a threshold $Ts_{free}$ for delimiting obstacle free and unknown pixels into a fused map by:
setting the value of each pixel whose probability of absence of obstacle is below the threshold $Ts_{obs}$ in at least one of the initial maps to a value representative of an obstacle in the fused map; and
setting the value of each pixel which is not an obstacle pixel in the fused map and whose probability of absence of obstacle is above the threshold $Ts_{free}$ in at least one of the initial maps to a value representative of an obstacle free pixel in the fused map.

2. The method of one of claim 1, wherein the limits of the initial map are predefined as a function of dimensions of an area where said robot may face immediate collision threats.

3. The method of claim 2, wherein the predefined dimension of a pixel is selected as a function of a collision avoidance distance.

4. The method of claim 3, wherein the initial map defines a square.

5. The method of claim 1, wherein the predefined value in the procedure of modifying the probabilities of one of presence and absence of obstacle of previous observations and for initializing said map is the average of the value that represents a presence of obstacle which is certain and the value that represents an absence of obstacle which is certain.

6. The method of claim 1, wherein said map is a map of probability of absence of an obstacle, which is a number between 0 and 1, wherein 0 represents a presence of obstacle which is certain, 1 an absence of obstacle which is certain, and 0.5 an unknown presence of obstacle.

7. The method of claim 6, wherein the threshold $Ts_{obs}$ for delimiting obstacle and unknown pixels is defined as a number in the interval [0;0.5], and the threshold $Ts_{free}$ for delimiting obstacle free and unknown pixels is defined as a number in the interval [0.5;1].

8. The method of claim 7, wherein a temporal evolution ratio $R_{temp}$ for modifying the probabilities of absence of obstacles is defined according to said threshold $Ts_{obs}$ and a predefined time of convergence $T_{conv}$ by the formula: $R_{temp}=\exp(\ln(1-2.0* Ts_{obs})/(T_{conv}*\text{update frequency}))$.

9. The method of claim 8 wherein the procedure of modifying the probabilities of absence of obstacle of previous observations uses a geometric distribution law for computing the value $VC_{320}$ of a pixel in map 320 according to the value $VC_{310}$ of this pixel in map 310: $VC_{320}=R_{temp}*(VC_{310}-0.5)+0.5$.

10. The method of claim 8, wherein merging the plurality of initial maps comprises the steps of:
generating a first pre-fused map and a second pre-fused map;
setting the value of the probability of absence of obstacle in a pixel in the first pre-fused map as the minimum of the values of the probability of absence in the same pixel in the plurality of initial maps;
setting the value of the probability of absence of obstacle in a pixel in the second pre-fused map as the maximum of the values of the probability of absence in the same pixel in the plurality of initial maps;
setting the value of the probability of absence of obstacle in a pixel in the first pre-fused map whose value is below the threshold of obstacle $Ts_{obs}$ to 0;
setting the value of the probability of absence of obstacle in a pixel in the first pre-fused map whose value is above the threshold of obstacle $Ts_{obs}$ to 1; and
setting the value of the probability of absence of an obstacle in a pixel in the fused map to the minimum of the value of probability of absence in the same pixel in the first and the second pre-fused maps.

11. The method of claim 1, wherein each map among said plurality of initial maps is updated using data acquired from a different set of sensors, which groups sensors that observe the same type of obstacles.

12. The method of claim 11, wherein:
a first set of sensors groups laser sensors on-board the robot;
a second set of sensors groups 3D cameras on-board the robot;
a third set of sensors groups ultrasonic sensors on-board the robot; and
a fourth set of sensors groups contact sensors on-board the robot.

13. The method of claim 1, wherein the acquiring, from the plurality of complementary sensing procedures, data representative of at least one of absence and presence of an obstacle in the environment of the robot comprises at least:
acquiring raw data values from a sensor;
creating a 6D sensor transform associated with the sensor using a Robot kinematic joint model and angular articular sensors; and
using said 6D sensor transform and said raw data to create a set of 3D points representing the obstacles observed by the sensor.

14. The method of claim 13, wherein updating values of probabilities of at least one of absence and presence of an obstacle in at least one pixel in the initial map from said data comprises at least:
filling at least at least one 2D pixel where at least one 3D point is found with a value representative of a presence of obstacle which is certain; and
filling each pixel in a line between said at least one pixel and the position of the sensor with a value representative of an absence of obstacle which is certain.

15. An autonomous robot, comprising:
a plurality of directional distance sensors;
a Robot kinematic joint model;
an on-board memory to store a plurality of initial maps defined around said robot, said plurality of initial maps having predefined limits and being paved by pixels of a predefined dimension, where a value of a probability of at least one of presence or absence of an obstacle is stored;
a module for initializing said plurality of initial maps by setting the value of each pixel to a predefined value;

a module for acquiring, from at least one of said directional distance sensors, data representative of at least one of absence and presence of an obstacle in the environment of the robot;

a module for concurrently applying, for the plurality of said directional distance sensors, to an initial map in the plurality of initial maps the followings steps:

modifying values of probabilities of absence or presence of obstacle to a value closer to a predefined value; and updating values of probabilities of at least one of absence and presence of an obstacle in at least one pixel of the initial map from said data; and a module for, after updating, merging the plurality of initial maps by a threshold $Ts_{obs}$ for delimiting obstacle and unknown pixels and a threshold $Ts_{free}$ for delimiting obstacle free and unknown pixels into a fused map by:

setting the value of each pixel whose probability of absence of obstacle is below the threshold $Ts_{obs}$ in at least one of the initial maps to a value representative of an obstacle in the fused map; and setting the value of each pixel which is not an obstacle pixel in the fused map and whose probability of absence of obstacle is above the threshold $Ts_{free}$ in at least one of the initial maps to a value representative of an obstacle free pixel in the fused map.

16. A non-transitory computer readable medium, comprising code that when executed by a computer cause the computer to automatically implement a method of determining a pixel map of the probability of at least one of absence and presence of an obstacle in the environment of the robot, said method comprising:

initializing, in a memory, a plurality of initial maps defined around an autonomous robot, said plurality of initial maps having predefined limits and being paved by pixels of a predefined dimension, where a value of a probability of at least one of absence and presence of an obstacle in each pixel is set to a predefined value;

acquiring, from at least a sensing procedure of a first type, data representative of at least one of absence and presence of an obstacle in the environment of the robot;

concurrently applying, to an initial map in the plurality of initial maps the followings steps:

modifying values of probabilities of absence or presence of obstacle to a value closer to a predefined value; and updating values of probabilities of at least one of absence and presence of an obstacle in at least one pixel of the initial map from said data; and after updating, merging the plurality of initial maps by a threshold $Ts_{obs}$ for delimiting obstacle and unknown pixels and a threshold $Ts_{free}$ for delimiting obstacle free and unknown pixels into a fused map by:

setting the value of each pixel whose probability of absence of obstacle is below the threshold $Ts_{obs}$ in at least one of the initial maps to a value representative of an obstacle in the fused map; and setting the value of each pixel which is not an obstacle pixel in the fused map and whose probability of absence of obstacle is above the threshold $Ts_{free}$ in at least one of the initial maps to a value representative of an obstacle free pixel in the fused map.

* * * * *